(12) United States Patent
Gilbert

(10) Patent No.: US 6,721,415 B1
(45) Date of Patent: Apr. 13, 2004

(54) TELEPHONE VOICE MESSAGING SYSTEM AND METHOD USING OFF-HOOK IMMEDIATE TRIGGER

(75) Inventor: Quenton Lanny Gilbert, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/506,021

(22) Filed: Feb. 17, 2000

(51) Int. Cl.[7] .................................. H04M 3/42
(52) U.S. Cl. ................... 379/221.09; 379/88.17
(58) Field of Search .................. 379/67.1, 88.01, 379/88.17, 88.18, 88.25, 221.09

(56) References Cited

U.S. PATENT DOCUMENTS 6,233,315 B1 * 5/2001 Reformato et al. ...... 379/88.01
6,490,444 B1 * 12/2002 Bossemeyer, Jr. et al. .................. 379/88.12
6,510,207 B1 * 1/2003 Cannon et al. ............... 379/68

* cited by examiner

Primary Examiner—Creighton Smith
(74) Attorney, Agent, or Firm—Woodcock Washburn LLP

(57) ABSTRACT

A system and method is described for entering a voice messaging system when a telephone set goes off-hook. If no voice message is waiting, a dial tone is provided to the telephone set. If a message is waiting, a prompt is activated by a telephone system indicating that such message is waiting, and the subscriber is then prompted to listen to the waiting message. If the subscriber does not wish to listen to the waiting message, he can place a conventional telephone call. If the subscriber chooses to listen to the waiting message (e.g., by entering "*" or saying "yes"), control is passed to the voice messaging system and the message is delivered to the subscriber.

28 Claims, 2 Drawing Sheets

TELEPHONE VOICE MESSAGING SYSTEM AND METHOD USING OFF-HOOK IMMEDIATE TRIGGER

FIELD OF THE INVENTION

The present invention relates in general to telephone systems. More particularly, the present invention relates to telephone systems that offer voice messaging services to their subscribers.

BACKGROUND OF THE INVENTION

Over the years, many types of telephone voice messaging systems have been developed. One general type of telephone voice messaging system is a remote system that records and stores voice messages from incoming telephone calls after a specified number of rings go unanswered. Such a remote telephone voice messaging system stores telephone messages at a site remote from the subscriber and typically includes a central switchboard for intercepting telephone calls and storing messages. This type of remote telephone voice messaging system is often used with a typical public switched telephone system ("PSTN").

In a typical remote telephone voice messaging system, a voice messaging system ("VMS") of a telephone company automatically intercepts any telephone calls intended for a local telephone number which are not answered after a predetermined number of rings. Additionally, the VMS intercepts and stores messages intended for a local telephone number that is busy. The VMS then records and stores any received message. The voice messaging system usually communicates with central office switches using SMDI links and T-1 lines. Using the SMDI links, the voice messaging system transmits message waiting indicator requests and message completion requests to the central office switch. A VMS is usually coupled with a service control point ("SCP").

The telephone voice messaging system may alert a subscriber to the presence of stored messages by changing the dial tone of the subscriber's telephone set to a unique tone, such as a stutter dial tone. The central office switch sends a stutter dial tone to the subscriber location when the subscriber location goes off-hook. The stutter dial tone provides an audible indication that a voice message is waiting. The subscriber recognizes the tone by picking up the receiver of the telephone set and listening. The subscriber then accesses the messages stored by the telephone company according to the prescribed procedures for that telephone voice messaging system, such as dialing a predetermined access telephone number and entering a numeric access code or personal identification number (PIN).

A subscriber location can then access the voice message system over its established voice path and any waiting message can be transmitted by the voice messaging system to the subscriber location. After the subscriber accesses the voice messaging system, the voice messaging system sends a completion request to the switch, instructing it to discontinue sending a stutter dial tone and to now send a normal dial tone to the subscriber location when it goes off-hook.

One problem with current automated telephone voice messaging systems is that it is time and labor intensive for a subscriber to call a remote location (e.g., the telephone company) and enter a PIN to access the messaging system. Moreover, the subscriber must remember the access telephone number and the PIN for the messaging system. If the subscriber forgets or does not know the access telephone number or PIN, he will be unable to retrieve any messages that have been stored.

For these reasons, it would be desirable to automatically connect the subscriber to a stored message center when the telephone handset is "picked up" (i.e., the telephone goes off-hook), thereby minimizing the time and manual effort required of the subscriber to access such a remote telephone voice messaging system.

SUMMARY OF THE INVENTION

The present invention is directed to a system and method for entering a voice messaging system when a telephone set goes off-hook. If no voice message is waiting, a dial tone is provided to the telephone set. If a message is waiting, a prompt is activated by a telephone system indicating that such message is waiting, and the subscriber is then prompted to listen to the waiting message. If the subscriber does not wish to listen to the waiting message, he can place a conventional telephone call. If the subscriber chooses to listen to the waiting message (e.g., by entering "*" or saying "yes"), control is passed to the voice messaging system and the message is delivered to the subscriber.

The foregoing and other aspects of the present invention will become apparent from the following detailed description of the invention when considered in conjunction with the accompanying drawings.

DESCRIPTION OF EXEMPLARY EMBODIMENTS AND BEST MODE

Referring now to the figures, a preferred embodiment of the system and method of the present invention will be described. For purposes of this description, it is assumed that the reader is familiar with basic telephony concepts and terminology.

Figure 1:
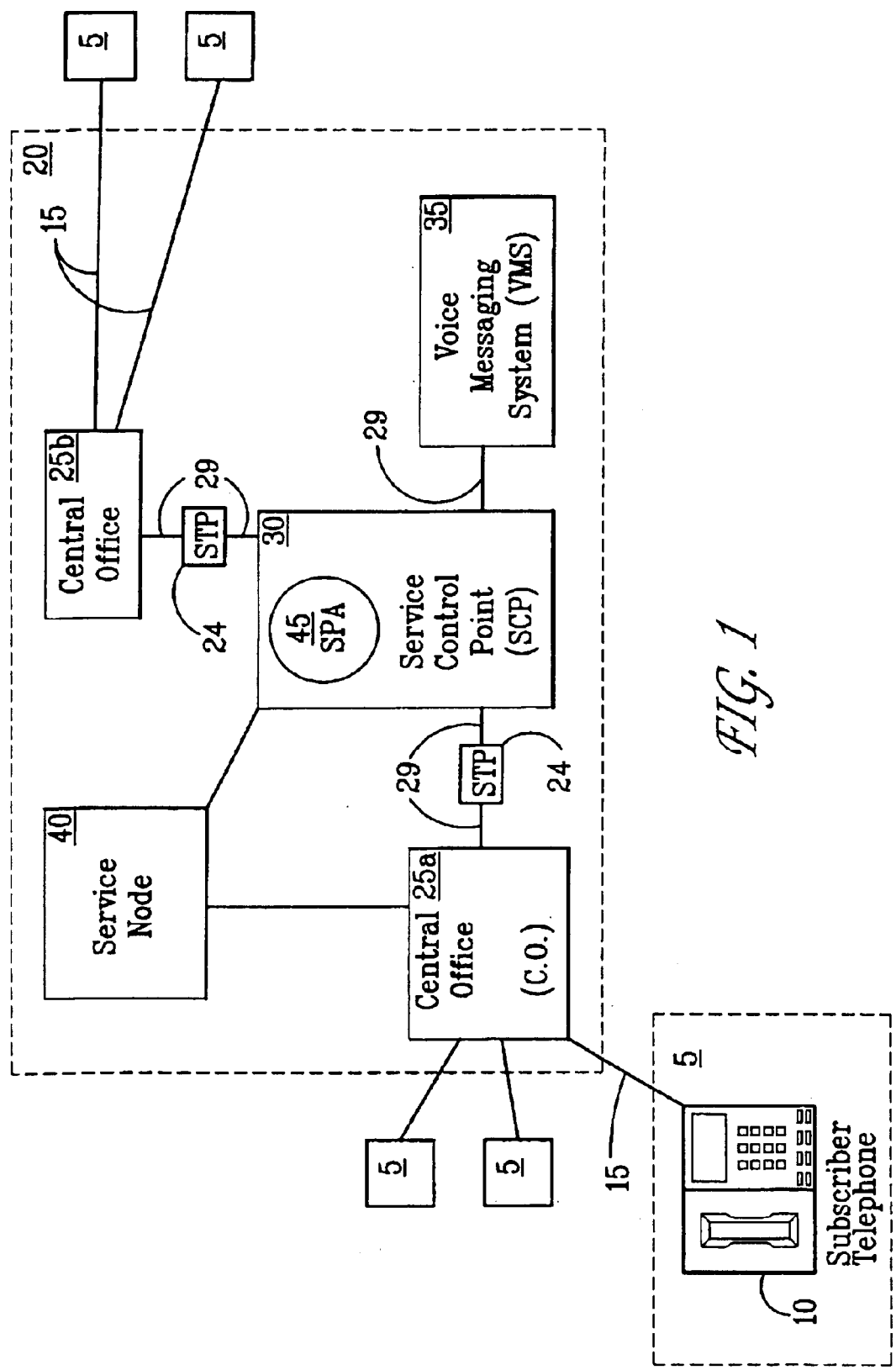
FIG. 1 shows a simplified schematic diagram including a local telephone set, a central office, a service control point, and a voice messaging system in accordance with a first embodiment of the present invention.

Referring to FIG. 1, a subscriber location 5 including a subscriber telephone set 10 is connected via a telephone line 15 (e.g., POTS, or similar) to a telephone system 20 including at least one central office switch 25a, at least one service control point 30 ("SCP"), a remote voice messaging system 35 ("VMS"), and a service node ("SN") 40. This exemplary environment is a public switched telecommunication network ("PSTN"). A portion of the PSTN is illustrated in FIG. 1 and described generally below.

In particular, the detailed portion of the PSTN illustrates a part of the Advanced Intelligent Network ("AIN") of a typical local exchange carrier. For brevity, only a basic explanation of the PSTN is provided herein. Where the PSTN operates or is composed differently in an important aspect from that which would be understood by those skilled in the art, additional details are provided herein. For further information regarding the referenced PSTN and AIN aspects thereof, the interested reader is referred to the patent to Weisser, U.S. Pat. No. 5,430,719, which is incorporated herein by reference.

The AIN includes a variety of interconnected network elements. A group of such network elements includes the plurality of central offices 25a, 25b which are service switching points ("SSPs"). A central office or SSP is a switch and the terms are used interchangeably herein. As further illustrated in FIG. 1, the SSPs 25a, 25b have a plurality of subscriber lines 15 connected thereto. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones commonly designated as 5. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs are interconnected by a plurality of trunk circuits. These are the voice path trunks that interconnect the SSPs to connect communications. The term "communication" or "call" is used herein to include all messages that may be exchanged between caller and called party in the network illustrated in FIG. 1. Each of the SSPs 25a, 25b is connected to another type of AIN element referred to as a local signal transfer point ("STP") 24 via respective data links 29. Currently, these are data links employing a signaling protocol referred to as Signaling System 7 (SS7), which is well known to those skilled in the art. Much of the intelligence of the AIN resides in yet another type of AIN element referred to as a local SCP 30 that is connected to STP 24 over a SS7 data link. Among the functions performed by the SCP 30 is the maintenance of network databases and subscriber databases. These databases may be used in providing temporary telecommunication services to a customer. Typically, the SCP 30 is also the repository of service package applications ("SPAs") 45 that are used in connection with or as part of the databases in the application of telecommunication services or enhanced features to calling lines.

In order to keep the processing of data and calls as simple as possible, a relatively small set of triggers is defined as the SSPs for each call. A trigger in the AIN is an event associated with a particular calling line that generates a packet to be sent to an SCP. The trigger causes the SCP to query its database for processing instructions with respect to the particular call. The results of the database inquiry are sent back to the SSP in a response from the SCP 30 through STP 24. The return packet includes instructions to the switch as to how to process the call. The instructions may be to take some special action as a result of a customized calling service or enhanced feature. In response, the switch moves through its call states, collects the called digits, and generates further packets that are used to set up and route the calls. Similar devices for routing calls among various local exchange carriers are provided by regional STP and regional SCP.

As illustrated in FIG. 1, the AIN also includes a service circuit node 40 ("SCN"), which may also be referred to herein as a service node. SN 40 includes voice and dual tone multi-frequency ("DTMF") signal recognition devices and voice synthesis devices. In addition, SCN 40 may include a data assembly interface. SN 40 is connected to the local SCP 30 via data link using an X.25 protocol. In addition, SN 40 typically is connected to one or more (but usually only a few) SSPs via Integrated Service Digital Network ("ISDN") links as shown by the connection to SSP or central office switch 25a.

In accordance with the present invention, an SPA 45 running on the SCP 30 processes calls and is appropriately connected to the voice messaging system 35. The central office switch 25a may be connected to a plurality of subscriber sets 10 or locations 5. Additionally, the SCP 30 may provide routing instructions to a plurality of central offices 25a. Connections 29 between the central office 25a, the SCP 30, and the voice messaging system 35 are preferably TCP/IP high speed network connections (e.g., fiber optic, ethernet, etc.).

The voice messaging system 35 permits the telephone system 20 to provide a voice messaging service for each subscriber location 5. Subscriber locations 5 which subscribe to the voice messaging service can have their unanswered telephone calls directed to the voice messaging system 35 where they are recorded. Thus, in the situation where the telephone set 10 rings and there is no answer after a number of rings, the remote voice messaging system 35 may take a message. More particularly, the central office 25a determines that the subscriber location 5 has not answered and/or is on the phone, and thus routes the call to the voice messaging system 35. The subscriber location 5 at a later time can then listen to these recorded messages by accessing the voice messaging system 35 when the subscriber goes off-hook at his telephone set 10. The telephone set 10 can be any conventional telephone set.

When the telephone set 10 goes off-hook, an Off-Hook Immediate AIN trigger fires on the central office 25a, the central office 25a messages the SCP 30, which in turn asks the voice messaging platform if the user has any messages waiting. If there is no message waiting, a dial tone is provided to the subscriber in accordance with the conventional operation of a telephone set 10 and the system 20. If there is a message waiting, an announcement is activated by the telephone system 20 stating that a message (or messages) is waiting, and then the subscriber is prompted to listen to the waiting message or messages. For example, the prompt may state "You have messages waiting. Enter '*' to listen to your messages. Otherwise, dial the number you wish to call." Alternatively, using voice recognition techniques, the subscriber can be prompted to say, for example, "yes" to listen to the stored message(s). Thus, the present invention replaces the conventional stutter dial tone or other indicators (e.g., visual indicators such as a lighted lamp) that is currently used with voice messaging systems to notify the subscriber of received voice messages. Preferably, any calls or input to the keypad, other than the key(s) used to listen to the messages (e.g., "*") will de-activate and override the announcement, and will immediately be placed. This allows emergency calls, such as 911, to be immediately placed.

If the subscriber does not wish to listen to the waiting message(s), he can employ the telephone 10 to dial a telephone number to place a conventional telephone call.

If the subscriber chooses to listen to the waiting message (s) (e.g., by entering "*" or saying "yes"), control is passed to the voice messaging system 35 and the subscriber will hear the messages. Thus, to access the messages, the subscriber does not need to dial a telephone access number or enter a PIN. Accordingly, there is no telephone number or PIN to remember, and the subscriber is able to access his messages more quickly and in a less labor intensive manner. For added security however, the system can be adapted to require the subscriber to enter a PIN in order to access the voice messaging system. In this manner, someone who merely picks up the subscriber telephone 10 will not be given immediate access to any stored messages.

Preferably, the system is an AIN system that includes AIN functionality. Specifically, it is contemplated that an AIN Off-hook Immediate ("OHI") trigger is put onto a subscriber's line. When the subscriber goes off-hook, the trigger fires and directs that the SCP 30 send a query (using TCP/IP, for example) to the subscriber's voice messaging system 35 to determine if the subscriber has any voice messages. If a message is waiting, the voice messaging system 35 generates a return message stating thus, which the SCP 30 receives. When the SCP 30 receives the return message, and if a voice recognition technique is being employed, the call is transferred to the service node 40 (for purposes of voice detection), and the subscriber hears a prompt (e.g., "You have new voice mail messages. To hear them, say 'Yes'; otherwise say 'No' or begin dialing a number you would like to call now".). Preferably, no prompt is issued if there are no messages waiting. Thus, a subscriber will not hear anything unless voice mail messages are waiting. As described above, the subscriber can dial a telephone number at any time to allow for the immediate dialing of 911 or other emergency numbers.

Alternatively, if a voice recognition technique is not being employed, the subscriber could be prompted to press a key on the telephone 10, such as "*", to hear his voice mail messages, and otherwise begin dialing a number. In this way, the service node 40 would not be utilized for voice detection and the central office switch 25a could do the digit collection. This is a less complex and less expensive implementation of the present invention.

After the subscriber accesses the voice messaging system 35 and hears the message(s), the voice messaging system 35 sends a completion signal to the central office 25a via SCP 30, instructing the central office 25a to discontinue the prompt and to now send a normal dial tone to the subscriber location 5 when it goes off-hook.

Figure 2:
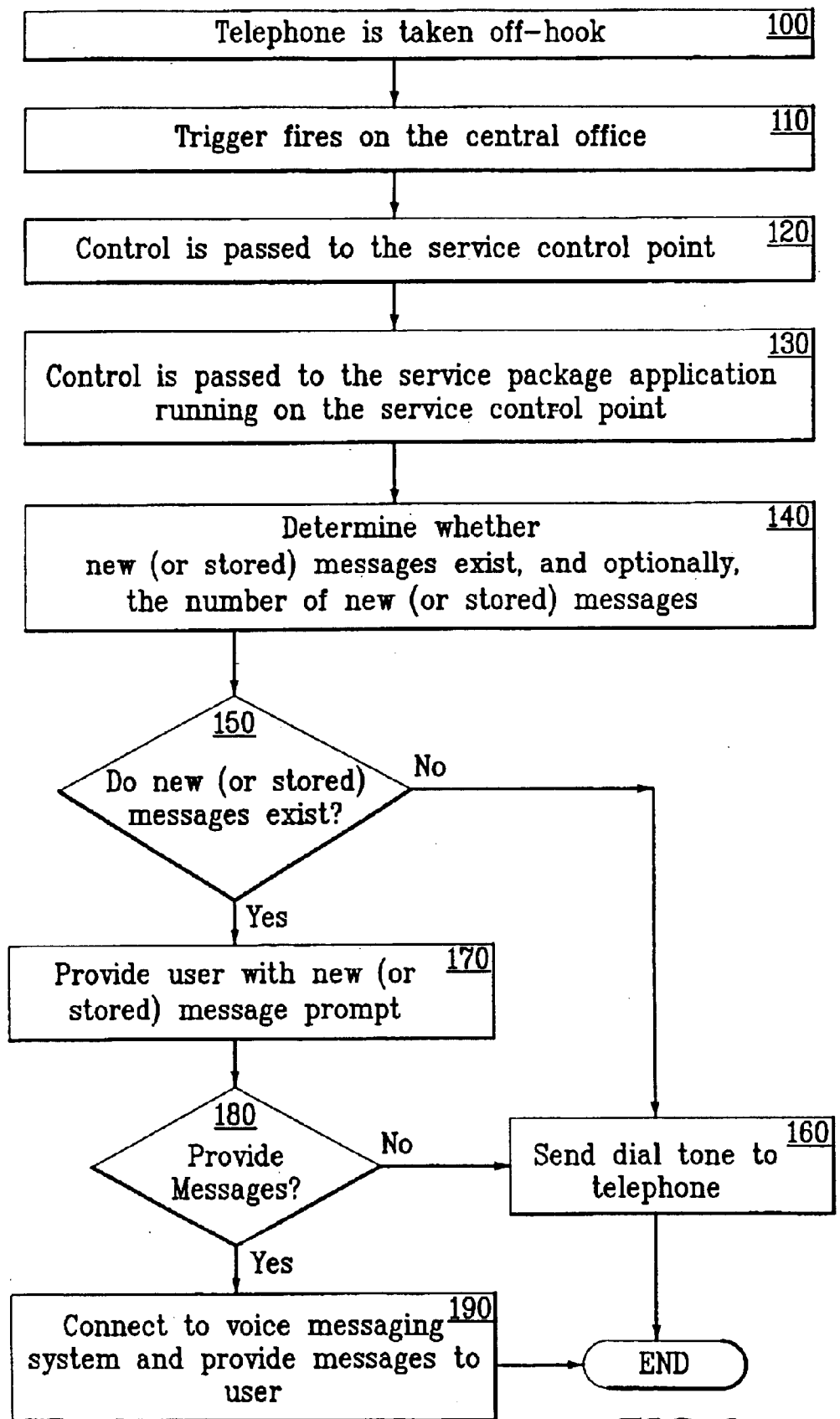
FIG. 2 shows a flow chart of an exemplary method of operation of the system of FIG. 1 in accordance with the present invention.

FIG. 2 shows a flow chart of an exemplary method of operation of the system of FIG. 1 in accordance with the present invention. At step 100, a subscriber takes his telephone 10 off-hook. At step 110, in the embodiment in which the invention is implemented on an AIN system, an AIN trigger (e.g., Off-hook Immediate (OHI) trigger) fires on the central office switch 25a. The central office switch 25a sends a query to the SCP 30, at step 120. The SCP 30 accepts the query and, at step 130, sends control to an SPA 45 that processes the call as follows.

The SPA 45 determines whether new messages exist, and optionally, the number of new messages (or, alternatively, whether stored messages exist and/or the number of stored messages, as described below), at step 140, by sending a message (e.g., a TCP/IP message) to the VMS 35 from which the subscriber is served. The VMS 35 replies to the SPA 45 running on the SCP 30 with the presence of new voice messages (and optionally, the number of new voice messages, as described below), if any, that the subscriber has in his voice mailbox.

If the reply to the SPA 45 from the VMS 35 is that the subscriber has no new messages at step 150 (e.g., the number of new messages is not greater than zero), then the SCP 30 directs the service node 40 to provide a standard dial tone to the subscriber at step 160, and the routine exits (i.e., conventional operation takes place in which the subscriber hears a normal dial tone). If the VMS 35 reply to the SPA 45 at step 150 is that the subscriber has new messages, then at step 170, the SCP 30 directs the service node 40 to prompt the caller with a message stating that new messages have been received (e.g., "You have new messages. To hear them, press *, otherwise please dial the number you wish to reach" or "You have new messages. To hear them, say "Yes", otherwise please dial the number you wish to reach") and optionally the number of new messages (e.g., "You have [X] new messages. To hear them, press *, otherwise please dial the number you wish to reach", where X is the actual number of new messages).

If the subscriber chooses to listen to the messages, at step 180 (e.g., presses the * key, says "Yes" in an embodiment where voice recognition is implemented, etc.), then control is passed to the VMS 35 to allow the subscriber to hear any new messages at step 190. If the subscriber dials anything else (or, in an embodiment where voice recognition is implemented, the subscriber says "No" for example), the call is processed in a conventional manner (i.e., a dial tone is provided and the subscriber can make a telephone call) and the routine exits.

In another embodiment in accordance with the present invention, the service package application 45 determines whether stored messages exist, (and optionally, the number of stored messages), as opposed to new messages, and advises the subscriber of the stored messages. In this way, the subscriber can listen to his stored messages which may include his new messages.

As mentioned above, it is contemplated that in addition to notifying the subscriber that new messages have been received as soon as the subscriber picks up the telephone, the present invention tells the subscriber how many new messages have been received. Moreover, upon the telephone going off-hook, other information about the messages can be provided, such as the type of each message (voice mail, e-mail initiated) and the calling line ID of the telephone set 10 that left the message (i.e., the caller's identification), etc.

Although the present invention has been described with respect to providing voice messages to a subscriber, it is contemplated and within the scope of the present invention that the present invention can be used to provide other types of non-voice message type information to the subscriber when the telephone goes off-hook without altering the invention herein described. For example, the telephone system 20 can deliver various content information such as weather and traffic immediately to the telephone when the subscriber goes off-hook (e.g., using the connection 29 (e.g., TCP/IP connection) to the service control point 30 after an off-hook trigger (e.g., OHI trigger) fires). In this case, the subscriber can enter a key, such as "*", to get a dial tone, or alternately, can dial any number to de-activate the information delivery and dial out. The information can be stored in the voice messaging system 35 or any other storage means, such as a database or computer memory (not shown). The controller for directing the information delivery can reside in the central office 25a, the service control point 30, or separately therefrom.

Moreover, the telephone system 20 can provide advertisements when the subscriber picks up the telephone 10. For example, these advertisements could be provided in exchange for a reduced telephone service fee (e.g., a subscriber pays a reduced telephone service fee if he is willing to listen to a predetermined number of advertisements).

Targeted advertising can be implemented based on a subscriber's demographics.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A telephone system coupled to a telephone subscriber location for providing telephone communications for the telephone subscriber location, the telephone system comprising:
   a voice messaging system that stores messages for the subscriber location;
   a service control point coupled to the voice messaging system that determines from the voice messaging system if a message is waiting for the subscriber location; and
   a central office coupled to the service control point that receives from the service control point a message waiting signal associated with the subscriber location in the voice messaging system, the message waiting signal indicating that the voice messaging system contains a message for the subscriber location, the central office sending a verbal prompt to the subscriber location indicating that the voice messaging system contains the message for the subscriber location when the subscriber location goes off-hook.

2. The telephone system according to claim 1, wherein the central office is alerted to an off-hook condition by an AIN trigger.

3. The telephone system according to claim 1, wherein the service control point comprises a service package application that queries the voice messaging system.

4. The telephone system according to claim 3, wherein the service package application determines a number of stored messages and provides the number of stored messages to the cental office for inclusion in the verbal prompt.

5. The telephone system according to claim 1, wherein the message is provided to the subscriber location by the voice messaging system via the central office if the central office receives a predetermined input from the subscriber location responsive to the prompt.

6. The telephone system according to claim 5, wherein the predetermined input is a pressed key on a keypad at the subscriber location.

7. The telephone system according to claim 5, wherein the predetermined input is a verbal response, the system further comprising a service node that provides speech recognition capability that interprets the verbal response.

8. The telephone system according to claim 1, wherein the prompt is deactivated if the central office receiving a predetermined input responsive to the prompt.

9. The telephone system according to claim 8, wherein the predetermined input is a pressed key on a keypad at the subscriber location.

10. The telephone system according to claim 8, wherein the predetermined input is a verbal response, the system further comprising a service node that provides speech recognition capability that interprets the verbal response.

11. The telephone system according to claim 1, wherein the voice messaging system delivers a completion signal to the central office after the subscriber location accesses the voice messaging system, and the central office is responsive to the delivered completion signal to de-activate the prompt.

12. A method for use with a telephone system coupled to a telephone subscriber location for providing telephone communications for the telephone subscriber location including connections to a voice messaging system, comprising:
    determining if a message exists in a voice messaging system for the subscriber location when the subscriber location goes off-hook;
    generating a second message if the message exists and forwarding the second message to a central office serving the subscriber location when the subscriber location goes off-hook, wherein the second message is a TCP/IP message; and
    sending a verbal prompt to the subscriber location indicating that the voice messaging system contains the message for the subscriber location.

13. The method according to claim 12, further comprising alerting the central office to an off-hook condition by an AIN trigger.

14. The method according to claim 12, further comprising querying the voice messaging system to determine if the message exists, the second message being generated responsive to the result of the query.

15. The method according to claim 12, further comprising determining a number of stored messages and providing the number of stored messages to the central office for inclusion in the verbal prompt.

16. The method according to claim 12, further comprising providing the message to the subscriber location if the central office receives a predetermined input from the subscriber location responsive to the prompt.

17. The method according to claim 16, wherein the predetermined input is one of a pressed key on a keypad at the subscriber location and a verbal response.

18. The method according to claim 12, further comprising de-activating the prompt if the central office receives a predetermined input from the subscriber location responsive to the prompt.

19. The method according to claim 18, wherein the predetermined input is one of a pressed key on a keypad at the subscriber location and a verbal response.

20. The method according to claim 12, further comprising delivering a completion signal to the central office after the subscriber location accesses the voice messaging system, and de-activating the prompt.

21. A system for providing information to a telephone subscriber location, comprising:
    a storage device that stores the information;
    a cental office comprising an off-hook detector for detecting an off-hook condition of the subscriber location; and
    a controller coupled to the storage device and the central office for retrieving the information responsive to the detected off-hook condition, providing a TCP/IP message waiting signal to the central office when the subscriber location goes off-hook, the message waiting signal indicating that the information is for the subscriber location, and forwarding the information to the subscriber location via the central office when the subscriber location goes off-hook.

22. The system according to claim 21, wherein the central office is alerted to the off-hook condition by an AIN trigger.

23. The system according to claim 21, wherein the information comprises at least one of news, weather, traffic data, and advertisements.

24. The system according to claim 21, wherein the information delivery is de-activated if the central office receives a predetermined input from the subscriber location.

25. A method of providing information to a telephone subscriber location, comprising:

storing the information in a storage device;

detecting an off-hook condition of the subscriber location at a central office;

retrieving the information from the storage device responsive to the detected off-hook condition;

providing a TCP/IP message waiting signal to the central office when the subscriber location goes off-hook, the message waiting signal indicating that the information is for the subscriber location; and forwarding the information to the subscriber location when the subscriber location goes off-hook.

26. The method according to claim 25, wherein detecting the off-hook condition comprises detecting an AIN trigger.

27. The method according to claim 25, wherein the information comprises at least one of news, weather, traffic data, and advertisements.

28. The method according to claim 25, further comprising de-activating the information delivery responsive to receiving a predetermined input from the subscriber location.

* * * * *

UNITED STATES PATENT AND TRADEMARK OFFICE
CERTIFICATE OF CORRECTION

PATENT NO. : 6,721,415 B1
DATED : April 13, 2004
INVENTOR(S) : Quenton Lanny Gilbert It is certified that error appears in the above-identified patent and that said Letters Patent is hereby corrected as shown below:

Title page,
Item [56], References Cited, U.S. PATENT DOCUMENTS, include the following:

| | | | |
|---|---|---|---|
| -- 5,345,497 | 9/1994 | Amoroso et al. | 379/33 |
| 5,363,431 | 11/1994 | Schull et al. | 379/67 |
| 5,384,832 | 1/1995 | Zimmerman et al. | 379/67 |
| 5,664,008 | 9/1997 | Bossi et al. | 379/67 |
| 5,684,862 | 11/1997 | Finnigan | 379/88 |
| 5,708,699 | 1/1998 | Concepcion et al. | 379/89 |
| 5,754,628 | 5/1998 | Bossi et al. | 379/67 |
| 5,802,166 | 9/1998 | Garcia et al. | 379/372 |
| 5,802,466 | 9/1998 | Gallant et al. | 455/413 |
| 4,811,382 | 3/1989 | Sleevi | 379/67 |
| 5,652,784 | 7/1997 | Blen et al. | 379/67 |
| 5,430,719 | 7/1995 | Weisser, Jr. | 370/58.2 -- |

FOREIGN PATENT DOCUMENTS, include the following:
-- 0 585 004 A2   3/2/1994   EPO
   2 316 268 A    2/18/1998  UK --

Signed and Sealed this

Eighth Day of June, 2004

JON W. DUDAS
*Acting Director of the United States Patent and Trademark Office*